United States Patent
Atia (10) Patent No.: US 11,313,591 B1
(45) Date of Patent: Apr. 26, 2022

(54) UNIVERSAL CLAMP APPARATUS TO ACCOMMODATE SOLAR PANEL FRAMES WITH DIFFERENT THICKNESSES

(71) Applicant: Moti Atia, Newbury Park, CA (US)

(72) Inventor: Moti Atia, Newbury Park, CA (US)

(*) Notice: Subject to any disclaimer, the term of this patent is extended or adjusted under 35 U.S.C. 154(b) by 120 days.

(21) Appl. No.: 16/918,865

(22) Filed: Jul. 1, 2020

Related U.S. Application Data (63) Continuation-in-part of application No. 16/673,728, filed on Nov. 4, 2019, which is a continuation-in-part of application No. 16/388,744, filed on Apr. 18, 2019, now abandoned, which is a continuation-in-part of application No. 15/701,102, filed on Sep. 11, 2017, now abandoned.

(51) Int. Cl.
*F24S 25/636* (2018.01)
*H02S 20/23* (2014.01)

(52) U.S. Cl.
CPC ............ *F24S 25/636* (2018.05); *H02S 20/23* (2014.12)

(58) Field of Classification Search
CPC ......... Y02E 10/47; F24S 25/634; F24S 25/63; F24S 25/61; F24S 2025/6003; F24S 25/60; F24S 25/00; H02S 20/23
See application file for complete search history.

(56) References Cited

U.S. PATENT DOCUMENTS

| | | | |
|---|---|---|---|
| 8,806,813 B2 | 8/2014 | Plaisted | |
| 9,416,992 B2* | 8/2016 | Braunstein | H02S 20/23 |
| 9,531,319 B2* | 12/2016 | Braunstein | H02S 30/10 |
| 9,638,402 B2 | 5/2017 | Paradiso | |
| 9,777,948 B2* | 10/2017 | Braunstein | H02S 20/23 |
| 10,340,837 B2* | 7/2019 | Wildes | F24S 25/61 |
| 10,461,682 B2* | 10/2019 | Schuit | F24S 25/636 |
| 10,749,466 B2* | 8/2020 | Smeja | F16B 37/145 |
| 10,992,251 B2* | 4/2021 | Zuritis | F16B 2/065 |
| 2006/0086382 A1 | 4/2006 | Plaisted | |
| 2011/0260027 A1 | 10/2011 | Farnham, Jr. | |
| 2012/0102853 A1 | 5/2012 | Rizzo | |
| 2015/0129517 A1 | 5/2015 | Wildes | |
| 2015/0288320 A1 | 10/2015 | Stearns | |
| 2016/0268958 A1 | 9/2016 | Wildes | |
| 2017/0104442 A1 | 4/2017 | MacRostie | |
| 2017/0248294 A1 | 8/2017 | Paradiso | |

\* cited by examiner

*Primary Examiner* — Andrew J Triggs (74) *Attorney, Agent, or Firm* — Plager Schack LLP; Mark H. Plager; Eric Liou (57) ABSTRACT

A universal clamp apparatus for use to secure a solar panel frame to a rail coupled to a building roof is provided. The clamp apparatus includes an upper clamp member slidably mounted to a lower clamp member, a bolt disposed through the upper clamp member, and a grounding nut coupled to the lower clamp member and engaged with the bolt. The grounding nut has a base plate and a tubular portion extending through the lower clamp member to engage the bolt. The base plate of the grounding nut has a first pair of opposing edges having pointed pins configured to penetrate the frame of the solar panel to facilitate grounding of the solar panel. The grounding nut rotatably adjusts relative to the bolt to vary the separation distance between the lower clamp member and upper clamp member to permit the solar panel frames with different thicknesses to be secured therein.

9 Claims, 6 Drawing Sheets

UNIVERSAL CLAMP APPARATUS TO ACCOMMODATE SOLAR PANEL FRAMES WITH DIFFERENT THICKNESSES

RELATED APPLICATION

The application claims priority to non-provisional patent application U.S. Ser. No. 16/673,728 filed on Nov. 4, 2019, the entire contents of which is herein incorporated by reference. Non-provisional patent application U.S. Ser. No. 16/673,728 claims priority to non-provisional patent application U.S. Ser. No. 16/388,744 filed on Apr. 18, 2019, the entire contents of which is herein incorporated by reference. Non-provisional patent application U.S. Ser. No. 16/388,744 claims priority to non-provisional patent application U.S. Ser. No. 15/701,102 filed on Sep. 11, 2017, the entire contents of which is herein incorporated by reference.

BACKGROUND

The embodiments herein relate generally to mounting apparatuses used to secure solar panels to a building roof. More specifically, embodiments of the invention relate to a universal clamp apparatus used to secure solar panels to rails coupled to the building roof.

Solar panels, also known as solar modules, are generally positioned adjacent to each other and secured to the building's roof by rails and fasteners. In many instances, each solar panel is secured within a frame that is coupled to the building's roof by a plurality of solar panel rails and mounting devices. Each solar panel rail is mechanically fastened to a mounting device, which is coupled to a rafter of the roof by mechanical fasteners such as screws or bolts.

In order to complete the solar panel installation on the roof, the solar panel frame has to be secured to the solar panel rail. Installers use components such as clamps to secure the solar panel frame and corresponding panel secured therein to the rail. However, the installation process has become difficult due to the wide range of solar panel frames on the market offered by manufacturers. In particular, these solar panel frames are available with different thicknesses.

Installers of solar panels have to carry a variety of clamps when working with solar panel frames with different thicknesses. This is a burden and results in inefficient panel installations. Several mounting devices exist to accommodate solar panel frames with different thicknesses. However, these devices are complex and require additional parts to operate such as sleeves and the like.

As such, there is a need in the industry for a universal clamp apparatus for use in securing solar panel frames with different thicknesses to a rail coupled to a building roof, which addresses the limitations of the prior art. There is a further need for the clamp apparatus to secure a pair of adjacent solar panel frames to the rail. There is a further need for the clamp apparatus to provide an adequate grounding means for the secured solar panel to enhance operational safety.

SUMMARY

In certain embodiments of the invention, a universal clamp apparatus for use to secure a frame of a solar panel to a rail coupled to a building roof is provided. The clamp apparatus is configured to permit sliding adjustments to vary spacing within the apparatus to accommodate solar panel frames with different thicknesses. The clamp apparatus comprises a lower clamp member comprising a pair of protruding tabs, an upper clamp member slidably mounted to the lower clamp member and comprising a top portion positioned above the pair of protruding tabs of the lower clamp member, the upper clamp member configured to slidably adjust relative to the lower clamp member to vary a separation distance between the pair of protruding tabs of the lower clamp member and the top portion of the upper clamp member, a bolt disposed through the upper clamp member, and a grounding nut coupled to the lower clamp member, the grounding nut comprising a base plate and a tubular portion coupled to the base plate and extending through the lower clamp member to engage the bolt, the base plate comprising a first pair of opposing edges, each opposing edge in the first pair of opposing edges comprising a pointed pin configured to penetrate the frame of the solar panel to facilitate grounding of the solar panel, wherein the grounding nut is configured to rotatably adjust relative to the bolt to vary the separation distance between the pair of protruding tabs of the lower clamp member and the top portion of the upper clamp member to permit the solar panel frames with different thicknesses to be secured therein.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
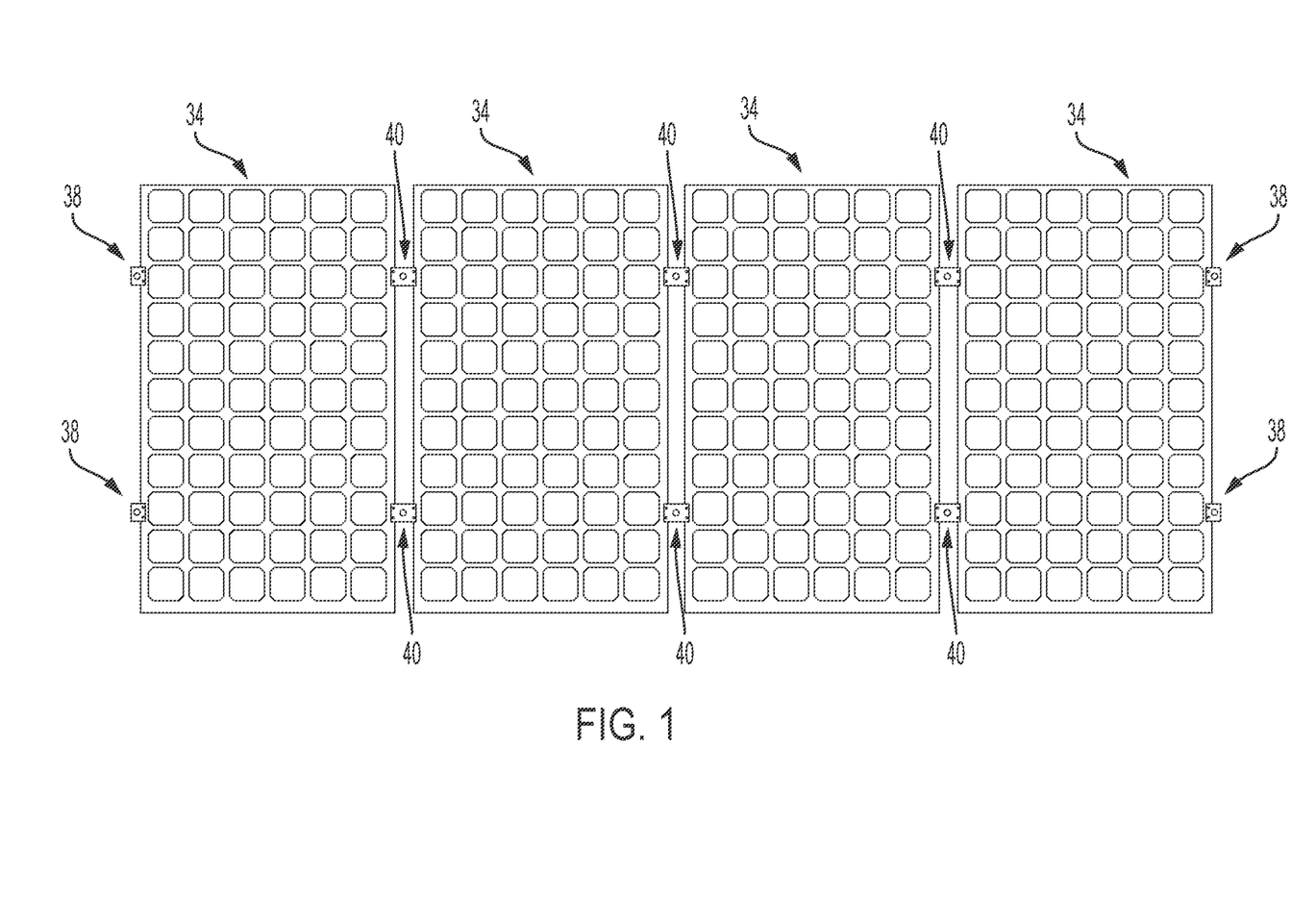
FIG. 1 depicts a schematic view of certain embodiments of the clamp apparatus shown in use.

As depicted in FIG. 1, the universal clamp apparatus is configured to secure solar panels 34 to a building roof. Each solar panel 34 is disposed within a frame that is received by the clamp apparatus. The clamp apparatus is also coupled to a rail that is mechanically coupled to the building roof. The universal clamp apparatus is advantageous because it is configured to accommodate frames of solar panels 34 with different thicknesses. In certain embodiments, the clamp apparatus comprises end clamp 38 coupled to the side of solar panel 34 or mid clamp 40 coupled to an adjacent pair of solar panels 34.

Figure 2:
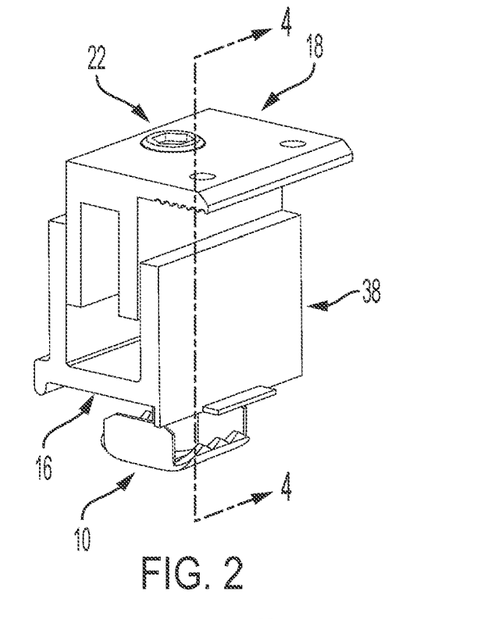
FIG. 2 depicts a perspective view of certain embodiments of the clamp apparatus.
Figure 3:
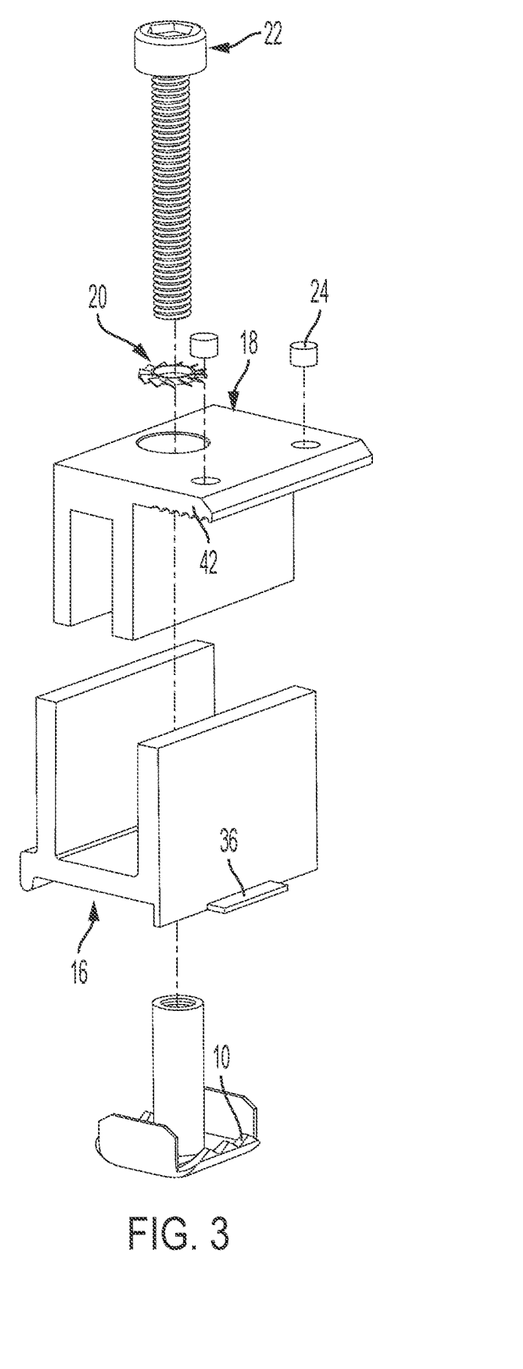
FIG. 3 depicts an exploded view of certain embodiments of the clamp apparatus.
Figure 4:
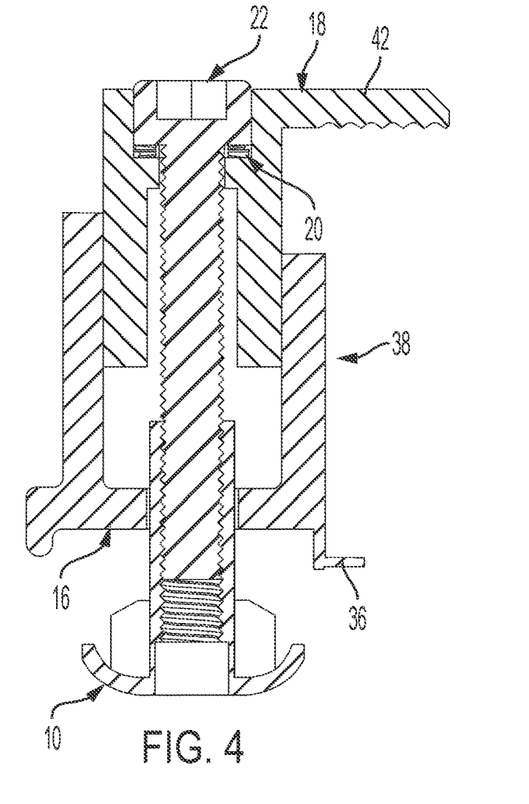
FIG. 4 depicts a section view of certain embodiments of the clamp apparatus taken along line 4-4 in FIG. 2.

As depicted in FIGS. 2-4, end clamp 38 generally comprises grounding nut 10, lower end clamp member 16, upper end clamp member 18 and bolt 22. Lower end clamp member 16 is a generally U-shaped member that is preferably made from aluminum. Lower end clamp member 16 comprises an opening configured to receive grounding nut 10 and lower lip 36, which extends from a side portion of the clamp member. Lower end clamp member 16 is configured to be disposed on and coupled to the solar panel rail by grounding nut 10.

Upper end clamp member 18 is a generally U-shaped member that is preferably made from aluminum and is configured to be disposed within the spacing of lower end clamp member 16. Upper end clamp member 18 comprises an opening configured to receive bolt 22 and upper lip 42, which extends from a side portion of the clamp member. In one embodiment, a plurality of grounding pins 24 are coupled to upper end clamp member 18 to enhance grounding of solar panel 34. In a preferred embodiment, grounding pins 24 are made from stainless steel. However, alternative materials may be used instead.

Upper end clamp member 18 is slidably mounted to lower clamp member 16 by bolt 22 and grounding nut 10. In this configuration, upper lip 42 is oriented generally parallel to lower lip 36. In one embodiment, upper lip 42 comprises a length that is greater than the length of lower lip 36.

Bolt 22 is preferably a stainless steel M6 bolt comprising a head portion and a threaded shaft. Bolt 22 is disposed through the opening in upper end clamp member 18 and extends within spacing between lower and upper clamp members 16, 18. In one embodiment, star washer 20 is disposed around the threaded shaft of bolt 22 and in contact with upper clamp member 18. Star washer 20 enhances the grounding of solar panel 34. Grounding nut 10 comprises a tubular portion with internal threads configured to engage with bolt 22. Grounding nut 10 is disposed though the opening in lower end clamp member 16 and extends within spacing of lower end clamp member 16 to engage with bolt 22.

In this configuration, grounding nut 10 is rotatably adjusted relative to bolt 22 to vary the separation distance between upper lip 42 of upper end clamp member 18 and lower lip 36 of lower end clamp member 16. More specifically, grounding nut 10 is rotated in a first direction to increase the separation distance between upper lip 42 and lower lip 36 and a second direction opposite the first direction to decrease the separation distance between upper lip 42 and lower lip 36. In a preferred embodiment, end clamp 38 can be adjusted such that the separation distance between upper lip 42 and lower lip 36 is within the approximate range of 28 mm-46 mm.

Figures 5, 6, 7:
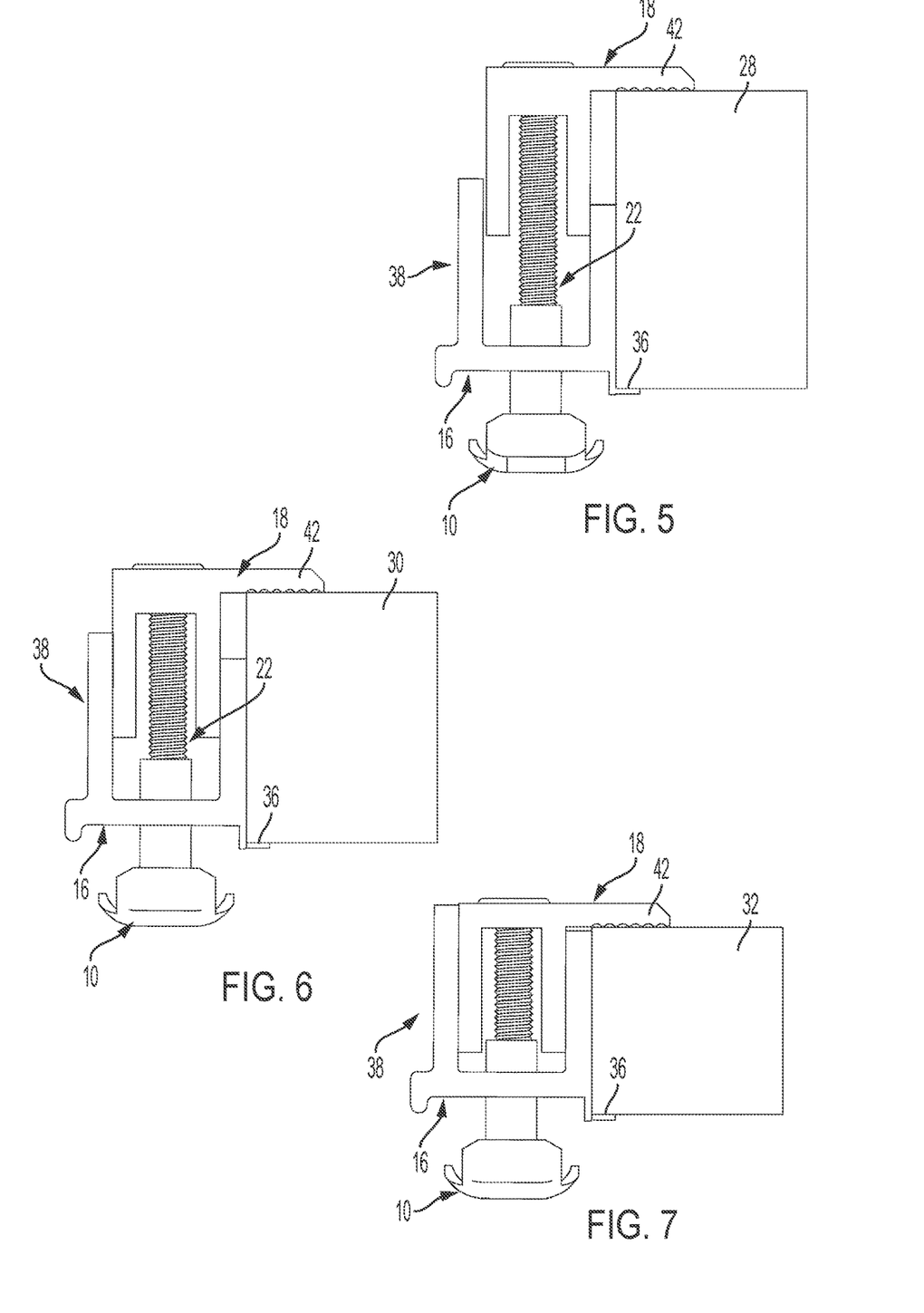
FIG. 5 depicts a side view of certain embodiments of the clamp apparatus shown in use.
FIG. 6 depicts a side view of certain embodiments of the clamp apparatus shown in use.
FIG. 7 depicts a side view of certain embodiments of the clamp apparatus shown in use.

In operation, end clamp 38 is coupled to the rail attached to the building roof and adjusted to accommodate the frame of solar panel 34. FIGS. 5-7 depict the adjustment of end clamp 38 to accommodate first exemplary solar panel frame 28 with a first thickness, second exemplary solar panel frame 30 with a second thickness, and third exemplary solar panel frame 32 with a third thickness. In all configurations, grounding nut 10 is rotatably adjusted relative to bolt 22 to enable the solar panel frame to be secured between upper lip 42 of upper end clamp member 18 and lower lip 36 of lower end clamp member 16. During this adjustment, grounding pins 24 puncture the frame of solar panel 34. Lower lip 36 provides support to the bottom of the frame and prevents solar panel 34 from dropping.

It shall be appreciated that the components of end clamp 38 may have variable shapes in alternative embodiments. In one alternative embodiment, lower end clamp member 16 comprises a generally L-shaped member with a pair of protruding module support lips positioned beneath upper lip 42 of upper end clamp member 18. Other modifications to the components of lower and upper end clamp members 16, 18 are possible in other embodiments of the invention.

Figure 8:
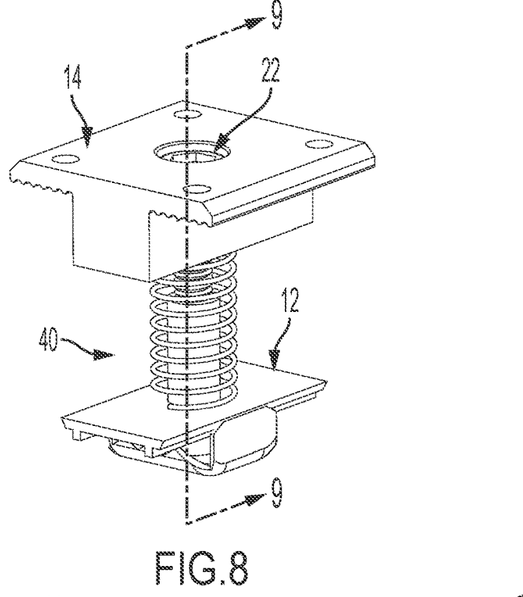
FIG. 8 depicts a perspective view of an alternative embodiment of the clamp apparatus.
Figure 9:
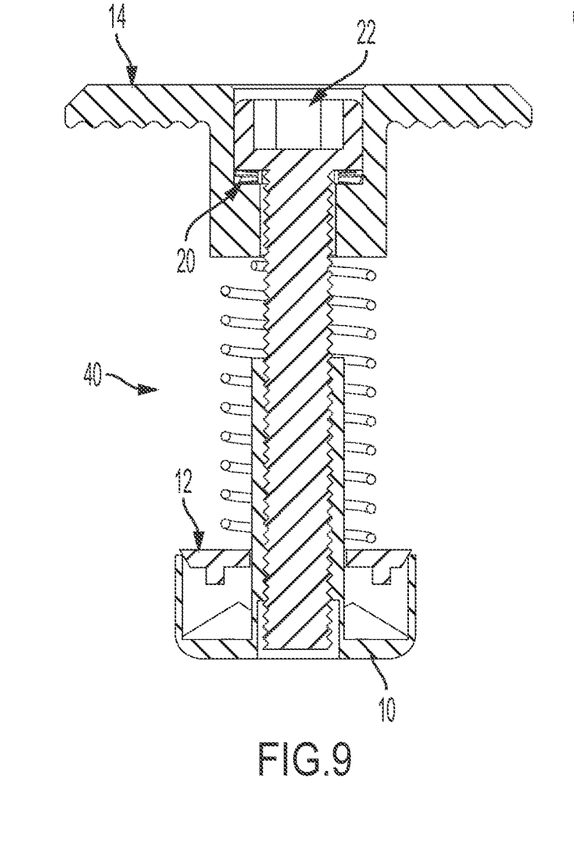
FIG. 9 depicts a section view of the alternative embodiment of the clamp apparatus taken along line 9-9 in FIG. 8.
Figure 10:
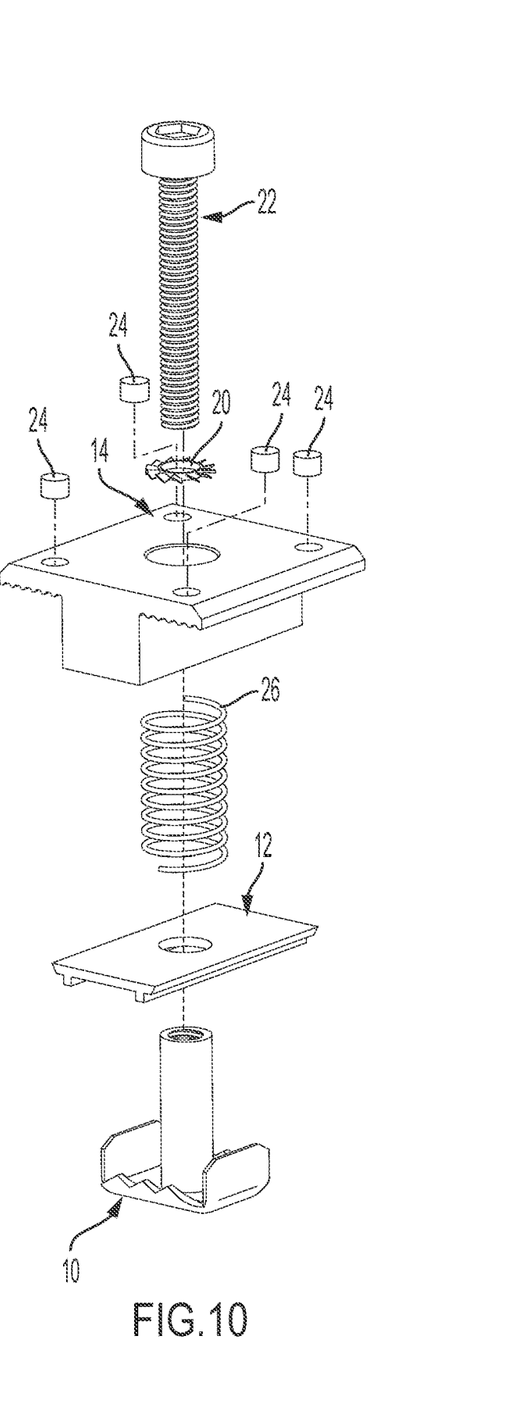
FIG. 10 depicts an exploded view of the alternative embodiment of the clamp apparatus.

As depicted in FIGS. 8-10, mid clamp 40 generally comprises grounding nut 10, base clamp member 12, spring 26, upper clamp member 14 and bolt 22. Base clamp member 12 is a generally rectangular member that is preferably made from plastic. Base clamp member 12 comprises an opening configured to receive grounding nut 10. Base clamp member 12 is disposed on and coupled to the solar panel rail by grounding nut 10, which extends within the channel of the rail.

Spring 12 is disposed on base clamp member 12 around the opening and is configured to contact upper clamp member 14. Spring 12 provides adequate tension to provide space between base clamp member 12 and upper clamp member 14 sufficiently large to receive the pair of adjacent solar panel frames therein. In one embodiment, spring 12 is preferably made from metal. However, alternative materials may be used instead.

Upper clamp member 14 is preferably made from aluminum and comprises a generally T-shaped member. In one embodiment, upper clamp member 14 is made from 6005-T5 aluminum. Upper clamp member 14 comprises an opening configured to receive bolt 22. In one embodiment, a plurality of grounding pins 24 are coupled to upper clamp member 14 to enhance grounding of the adjacent pair of solar panels 34. In a preferred embodiment, grounding pins 24 are made from stainless steel. However, alternative materials may be used instead.

Upper clamp member 14 is adjustably mounted to base clamp member 12 by mechanical fasteners such as bolt 22 and grounding nut 10. Bolt 22 is preferably a stainless steel M6 bolt comprising a head portion and a threaded shaft. Bolt 22 is disposed through the opening in upper clamp member 14 and extends within spring 26. In one embodiment, star washer 20 is disposed around the threaded shaft of bolt 22 and in contact with upper clamp member 14. Star washer 20 enhances the grounding of solar panels 34. Grounding nut 10 comprises a tubular portion with internal threads configured to engage with bolt 22. Grounding nut 10 is disposed though the opening in base clamp member 12 and extends within spring 26 to engage with bolt 22.

In this configuration, grounding nut 10 is rotatably adjusted relative to bolt 22 to vary the separation distance between upper clamp member 14 and base clamp member 12. Specifically, grounding nut 10 is rotated in a first direction to increase the separation distance between upper clamp member 14 and base clamp member 12 and a second direction opposite the first direction to decrease the separation distance between upper clamp member 14 and base clamp member 12. In a preferred embodiment, mid clamp 40 can be adjusted such that the separation distance between upper clamp member 14 and base clamp member 12 is within the approximate range of 28 mm-46 mm.

In operation, mid clamp 40 is coupled to the rail attached to the building roof and adjusted to accommodate the frames of a pair of adjacent solar panels 34. Grounding nut 10 is rotatably adjusted relative to bolt 22 to enable the pair of solar panel frames to be secured between upper clamp member 14 and base clamp member 12. During this adjustment, grounding pins 24 puncture the frames of solar panels 34.

It shall be appreciated that the components of end clamp 38 may have variable shapes in alternative embodiments. In certain embodiments as depicted in FIGS. 11-24, alternate end clamp 50 is illustrated, which is operated in substantially the same manner as previously described for end clamp 38 to accommodate solar panel frames with different thicknesses.

In certain embodiments as depicted in FIGS. 11-14, alternate end clamp 50 generally comprises flanged bolt 52, alternate lower clamp member 60, alternate upper clamp member 70 and alternate grounding nut 80. The components of alternate end clamp 50 are made from the same materials as the components previously described for end clamp 38, or can be made from alternate materials known in the field.

Alternate end clamp 50 is advantageous because it allows for sliding adjustments of alternate upper clamp member 70 relative to alternate lower clamp member 60 to accommodate solar panel frames having different thicknesses therein. Further, alternate end clamp 50 is beneficial because it comprises a shortened and enhanced grounding path for solar panel 34. Finally, alternate end clamp 50 facilitates proper grounding with any type of solar panel frame regardless of coating because it can penetrate through the anodization of the solar panel frame during assembly.

Figure 24:
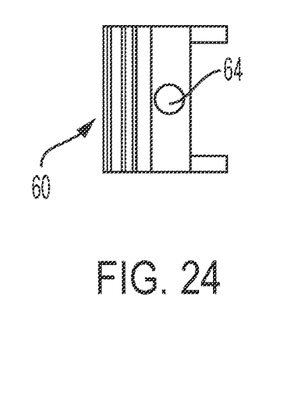
FIG. 24 depicts a top view of the alternative embodiment of the clamp apparatus illustrating the alternate lower clamp member.

In certain embodiments as depicted in FIGS. 11-12, 14 and 23-24, alternate lower clamp member 60 comprises a base continuously connected to both a pair of lower upright walls 62 and a pair of protruding tabs 64. As depicted in FIG. 24, the base of alternate lower clamp member 60 comprises lower clamp opening 64, which is configured to receive alternate grounding nut 80.

In certain embodiments as depicted in FIGS. 11-14 and 20-22, alternate upper clamp member 70 comprises top portion 72 continuously connected to upper upright wall 74. Upper upright wall 74 is configured to insert in the space between the pair of lower upright walls 62 of alternate lower clamp member 60. In one embodiment as depicted in FIGS. 11-14 and 21-22, top portion 72 of alternate upper clamp member 70 comprises recess 76 to receive flange bolt 52.

Figure 14:
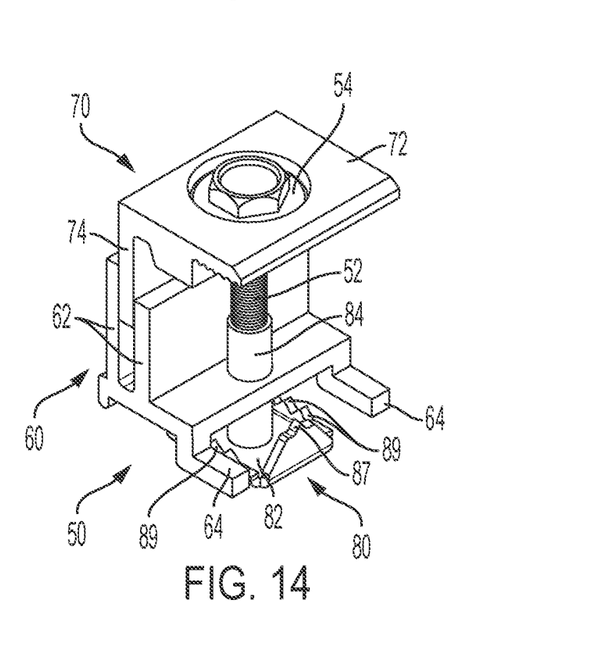
FIG. 14 depicts a perspective view of the alternative embodiment of the clamp apparatus illustrating the alternate end clamp.
Figure 15:
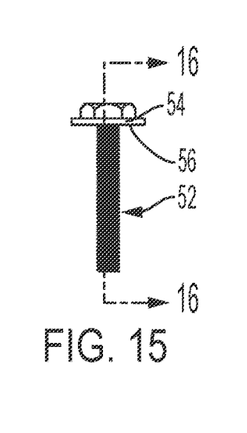
FIG. 15 depicts a side view of the alternative embodiment of the clamp apparatus illustrating a flanged bolt.
Figure 16:
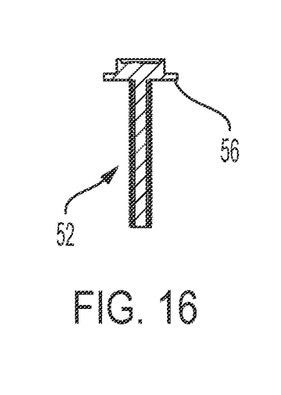
FIG. 16 depicts a cross-sectional view of the alternative embodiment of the clamp apparatus, taken along line 16-16 in FIG. 15.
Figure 17:
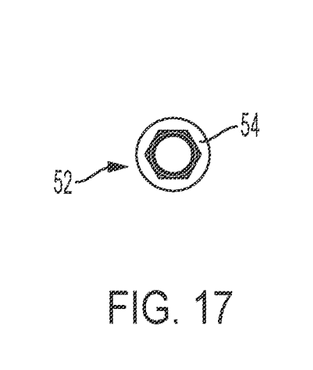
FIG. 17 depicts a top view of the alternative embodiment of the clamp apparatus illustrating the flanged bolt.
Figure 18:
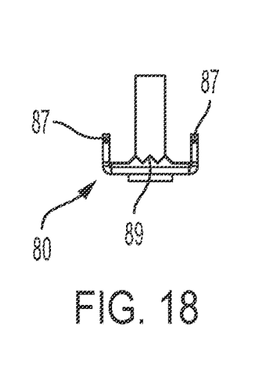
FIG. 18 depicts a side view of the alternative embodiment of the clamp apparatus illustrating an alternate grounding nut.
Figure 19:
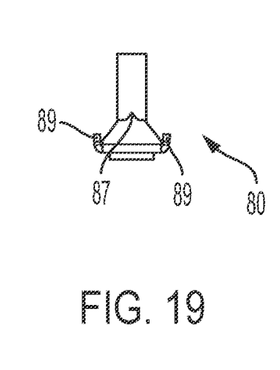
FIG. 19 depicts a front view of the alternative embodiment of the clamp apparatus illustrating the alternate grounding nut.
Figure 20:
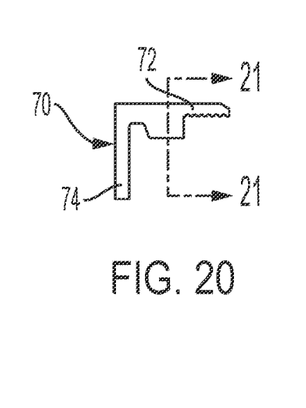
FIG. 20 depicts a side view of the alternative embodiment of the clamp apparatus illustrating an alternate upper clamp member.
Figure 21:
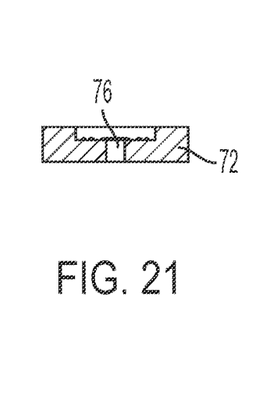
FIG. 21 depicts a cross-sectional view of the alternative embodiment of the clamp apparatus, taken along line 21-21 in FIG. 20.

In certain embodiments as depicted in FIGS. 15-17, flanged bolt 52 comprises flange 54 at the head of the bolt. The bottom surface of flange 54 comprises serrated portion 56. In one embodiment, flanged bolt 52 is a stainless steel M6 threaded bolt with a 13 mm hex serrated flange head. However, flanged bolt 52 can have variable specifications in alternative embodiments. In one embodiment as depicted in FIGS. 11-14 and 20-22, flanged bolt 52 is inserted through top portion 72 of alternate upper clamp member 70 so that flange 54 sits within recess 76 of alternate upper clamp member 70.

In certain embodiments as depicted in FIGS. 11-12, 14 and 18-19, alternate grounding nut 80 is made from any metal and generally comprises base plate 82 continuously connected to tubular portion 84. Base plate 82 comprises a first pair of opposing side edges 86 and a second pair of opposing side edges 88. Each side edge in the first pair of opposing side edges 86 comprises an upward extending pointed pin 87. Each side edge in the second pair of opposing side edges 88 comprises a plurality of upward extending teeth 89. In one embodiment, each side edge 88 comprises three adjacent teeth.

Figure 11:
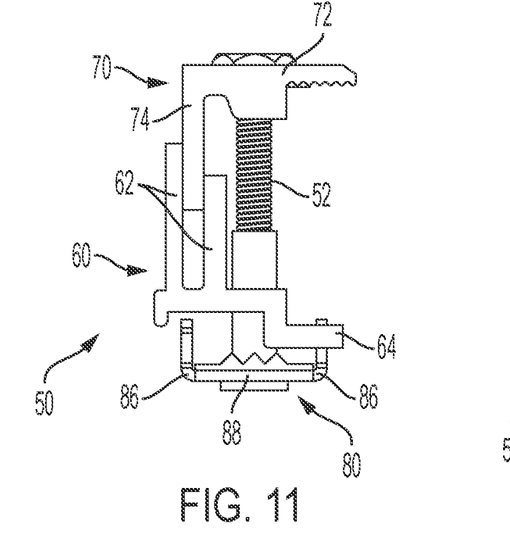
FIG. 11 depicts a side view of an alternative embodiment of the clamp apparatus illustrating an alternate end clamp.
Figure 12:
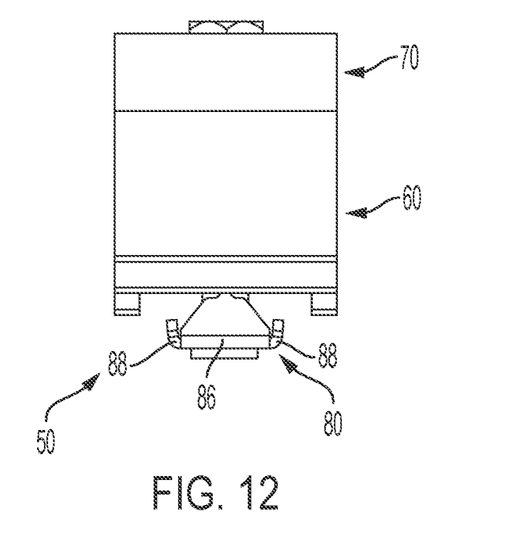
FIG. 12 depicts a rear view of the alternative embodiment of the clamp apparatus illustrating the alternate end clamp.
Figure 13:
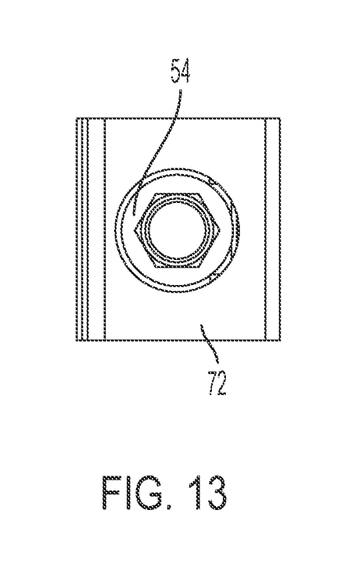
FIG. 13 depicts a top view of the alternative embodiment of the clamp apparatus illustrating the alternate end clamp.

In operation, alternate grounding nut 80 is inserted through lower clamp opening 64 in alternate lower clamp member 60 so that the threaded inner wall of tubular portion 84 engages with the threads of flanged bolt 52 as depicted in FIGS. 11 and 14. This secures alternate lower and upper clamp members 60, 70 together.

Alternate grounding nut 80 is rotatably adjusted relative to flanged bolt 52 to vary the separation distance between top portion 72 of alternate upper clamp member 70 and protruding tabs 64 of alternate lower clamp member 60. Specifically, alternate grounding nut 80 is rotated in a first direction to increase the separation distance between alternate lower clamp member 60 and alternate upper clamp member 70, and rotated in a second direction opposite the first direction to decrease the separation distance between alternate lower clamp member 60 and alternate upper clamp member 70.

Figure 22:
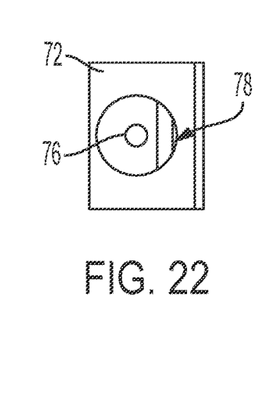
FIG. 22 depicts a top view of the alternative embodiment of the clamp apparatus illustrating the alternate upper clamp member.
Figure 23:
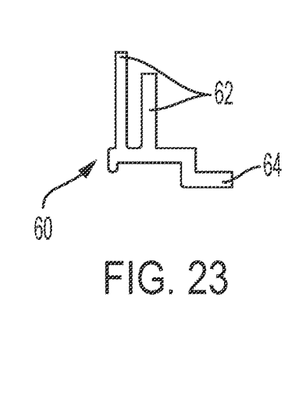
FIG. 23 depicts a side view of the alternative embodiment of the clamp apparatus illustrating an alternate lower clamp member.

After alternate grounding nut 80 is properly adjusted so that the solar panel frame sits between top portion 72 of alternate upper clamp member 70 and protruding tabs 64 of alternate lower clamp member 60, the grounding pathway is established for solar panel 34. In this assembled position, pointed pin 87 present between protruding tabs 64 of alternate lower clamp member 60 penetrates the bottom of the secured solar panel frame. At the same time, teeth 89 of alternate grounding nut 80 contact the rail coupled to the building roof. At the same time as depicted in FIGS. 11 and 22, serrated portion 56 of flanged bolt 52 extends through recess opening 78 in alternate upper clamp member 70 to penetrate through the top face of the solar panel frame.

It shall be appreciated that the components of the clamp apparatuses described in several embodiments herein may comprise any alternative known materials in the field and be of any color, size and/or dimensions. It shall be appreciated that the components of the clamp apparatuses described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A universal clamp apparatus for use to secure a frame of a solar panel to a rail coupled to a building roof, the clamp apparatus configured to permit sliding adjustments to vary spacing within the apparatus to accommodate solar panel frames with different thicknesses, the clamp apparatus comprising:
   a lower clamp member comprising a pair of protruding tabs;
   an upper clamp member slidably mounted to the lower clamp member and comprising a top portion positioned above the pair of protruding tabs of the lower clamp member, the upper clamp member configured to slidably adjust relative to the lower clamp member to vary a separation distance between the pair of protruding tabs of the lower clamp member and the top portion of the upper clamp member;
   a bolt disposed through the upper clamp member; and
   a grounding nut coupled to the lower clamp member, the grounding nut comprising a base plate and a tubular portion coupled to the base plate and extending through the lower clamp member to engage the bolt, the base plate comprising a first pair of opposing edges, each opposing edge in the first pair of opposing edges comprising a pointed pin configured to penetrate the frame of the solar panel to facilitate grounding of the solar panel;
   wherein the grounding nut is configured to rotatably adjust relative to the bolt to vary the separation distance between the pair of protruding tabs of the lower clamp member and the top portion of the upper clamp member to permit the solar panel frames with different thicknesses to be secured therein.

2. The universal clamp apparatus of claim 1, wherein the bolt comprises a flange with a serrated portion.

3. The universal clamp apparatus of claim 2, wherein the top portion of the upper clamp member comprises a recess configured to receive the flange of the bolt, the recess in the upper clamp member comprising an opening that permits the serrated portion of the bolt to extend therethrough to contact the frame of the solar panel, thereby facilitating grounding of the solar panel.

4. The universal clamp apparatus of claim 3, wherein the base plate of the grounding nut comprises a second pair of opposing edges, each opposing edge in the second pair of opposing edges comprising a plurality of teeth configured to contact the rail coupled to the building roof, thereby facilitating grounding of the solar panel.

5. The universal clamp apparatus of claim 4, wherein the plurality of teeth on each opposing edge in the second pair of opposing edges comprises three adjacent teeth.

6. The universal clamp apparatus of claim 4, wherein the lower clamp member comprises a pair of lower upright walls.

7. The universal clamp apparatus of claim 6, wherein the upper clamp member comprises an upper upright wall continuously connected to the top portion of the upper clamp member.

8. The universal clamp apparatus of claim 7, wherein the upper upright wall of the upper clamp member is configured to slidably adjust within space between the pair of lower upright walls of the lower clamp member.

9. The universal clamp apparatus of claim 8, wherein an interior wall of the tubular portion of the grounding nut is threaded.

* * * * *